United States Patent [19]

Heidrich et al.

[11] 4,447,126

[45] May 8, 1984

[54] UNIFORMLY INTENSE IMAGING BY CLOSE-PACKED LENS ARRAY

[75] Inventors: Paul F. Heidrich, Tucson, Ariz.; Robert A. Laff, Yorktown Heights; Thomas B. Light, Chappaqua, both of N.Y.

[73] Assignee: International Business Machines Corporation, Armonk, N.Y.

[21] Appl. No.: 394,976

[22] Filed: Jul. 2, 1982

[51] Int. Cl.³ .................... G02B 5/14; G03B 27/00
[52] U.S. Cl. ...................... 350/96.31; 354/5; 355/1
[58] Field of Search ............... 346/107 R; 350/96.31, 350/167, 413; 354/5; 355/1, 5, 8

[56] References Cited

U.S. PATENT DOCUMENTS

| | | | |
|---|---|---|---|
| 3,279,903 | 10/1966 | Siegmund | 350/96.31 |
| 3,952,311 | 4/1976 | Lapeyre | 354/5 |
| 4,264,130 | 4/1981 | Ogura | 350/96.31 |
| 4,345,833 | 8/1982 | Siegmund | 350/96.31 |

*Primary Examiner*—Bruce Y. Arnold
*Assistant Examiner*—William Propp
*Attorney, Agent, or Firm*—Jackson E. Stanland

[57] ABSTRACT

An improved optical printing head is described including a linear array of light sources, and a lens array comprised of graded index optical fibers arranged in a hexagonal close-packed array, there being at least three rows of individual fiber lenses. The linear array of light sources is aligned with, and parallel to, lines of symmetry of the graded index lens array, where the lines of symmetry are defined as lines along said graded index lens array which will transmit a line of light incident thereon with a minimum deviation in the intensity of light transmitted through the lens array. A photosensitive surface on a rotating drum is provided onto which light images from the optical printhead are incident. The print head can be used in optical printing machines.

10 Claims, 13 Drawing Figures y-DISPLACEMENT FROM CENTER OF LENS

- $y = +2y_0$
- $y = 0$
- $y = -2y_0$

- $y = +3y_0$
- $y = +y_0$
- $y = 0$
- $y = -y_0$
- $y = -3y_0$

UNIFORMLY INTENSE IMAGING BY CLOSE-PACKED LENS ARRAY

DESCRIPTION OF THE INVENTION

1. Technical Field

This invention relates to an improved optical printing head, useful in printers and copiers, and more particularly, to an improved technique for imaging a plurality of light sources onto a photosensitive surface with minimal deviation of light intensity at the image plane.

2. Background Art

Printing and copying machines are known in which images are produced on a photosensitive layer located on a moving drum or belt. These machines use the electrophotographic process; the photosensitive surface is initially charged and light images are incident upon the photosensitive surface to cause a discharge of those areas struck by the light. These machines are characterized by an optical printing head in which a plurality of light sources produce light output which are then imaged onto the photosensitive surface. The light sources are often light emitting diodes (LEDs) which are generally arranged in rows.

When such machines are used to print in the so-called "copy" mode, the development step is such that the regions of the photosensitive layer which have been struck by light are discharged, and do not pick up ink particles. These discharged regions provide the white background, ink (toner) particles adhere to those areas of the photosensitive layer which remain charged at a higher voltage. The light striking the photosensitive layer must have sufficient intensity and be sufficiently uniform that the background will remain uniformly white. For a machine to incorporate both electrophotographic copying and printing functions, this "copy" mode is the mode of choice.

When these machines are used in a "printing" mode, the development step is such that the ink particles adhere to those portions of the photosensitive layer which have been discharged by the incident of light. Uniform illumination is also required in this mode, but the effects on print quality caused by non-uniform illumination are generally not as sensitive as when the apparatus is used to print in a "copy" mode. The predominant effect of nonuniform illumination in the "print" mode is to produce uneven blackness.

Regardless of the use to which this apparatus is put, or the mode in which it is operated, it is thus important that the intensity of illumination be substantially constant over those areas of the photosensitive drum which are to be illuminated. This is often difficult to do when the light producing elements have different sizes and are arranged in a plurality of rows. An optical system is required which will uniformly transmit the light from a given row of LEDs as a single line of image area on the photosensitive surface. The imaging system should be such that the intensity of any single line of image areas is substantially constant along the lengths of the line.

The LED light sources are often arranged in linear arrays comprised of one or more rows of LEDs. These LEDs are produced on one or more semi-conductor chips. In those situations where the LEDs must be larger than the space between them so that a small overlap occurs between adjacent images, each linear array of light sources is provided by multiple rows of LEDs. It is difficult to provide uniform transmission of light images to the photosensitive drum when multiple row LED arrays are used.

In these machines, it is known to use electronics to produce a single line of image areas on the photosensitive drum from LED arrays comprised of one or more rows of LEDs. Due to the motions of the photoconductive surface and to the staggered timing of the activation of the LEDs, a single line of image areas can be produced on the photosensitive drum. If there is more than one row of LEDs in the linear light source array, the rows of image areas should be placed as close to one another as possible in order to avoid problems if the drum speed varies.

In the prior art, imaging lenses have been provided using an array of hexagonally close-packed optical fiber lenses termed a SELFOC lens (SELFOC is a trademark of Nippon Sheet Glass Company, Japan). The individual optical fiber lenses in the array have radially graded indices of refraction to provide focussing action, and the array can be comprised of many rows of such optical fibers. The individual fiber lenses are formed by cutting and polishing an optical fiber bundle crosswise in a predetermined dimension so as to obtain an image formation function with images of unit magnification. In these arrays, an image formation for one spot of the source is accomplished by means of superposition of images formed by a number of the optical fibers. The properties of these lenses are such that some non-uniformity of intensity will be produced in the image plane even if completely uniform sources are employed.

In order to solve the problem of providing uniform illumination of the photosensitive surface where a plurality of semiconducting LED chips is used, one solution has been the use of two SELFOC lenses (U.S. Pat. No. 4,318,587), where one SELFOC lens array is used to image the sources in one set of semiconducting chips, while the other SELFOC lens array is used to image the LEDs in the second set of semiconducting chips. Critical alignment of the semiconducting chips and the SELFOC lenses is required so that the images produced by both sets of chips will be along precisely parallel and coincident image lines on the photosensitive surface. This requires a difficult mechanical alignment and an additional cost is involved because two SELFOC lenses are used. Accordingly, it is an object of the present invention to provide an optical printhead which will image a row, or multiple rows, of light sources uniformly using a single SELFOC lens.

It is another object of the present invention to use a single hexagonally close-packed lens array (SELFOC) in a manner to provide substantially uniform transmission of light from a plurality of sources to a photosensitive surface.

It is another object of the present invention to provide an improved optical printhead having a minimum deviation of transmission of light from a plurality of sources to the surface of a photosensitive material.

It is a further object of this invention to use a graded index optical fiber array (SELFOC) in combination with a multiplicity of light sources located on different semiconducting chips in a manner to provide substantially uniform intensity of illumination on an image plane.

It is a still further object of the present invention to provide improved imaging of multiple rows of light sources onto a photosensitive surface along image lines characterized by minimum deviation of intensity along each of the multiple image lines.

It is another object of the present invention to provide an optical printhead using a single graded index optical fiber array comprised of at least three rows of optical fiber lenses, together with a plurality of light sources, wherein the light from the sources is imaged onto a photosensitive surface by said lens array with a minimum deviation of intensity across the imaged surface.

DISCLOSURE OF THE INVENTION

In its broadest sense, this invention is a combination of light sources and a single hexagonal close-packed array of graded index optical fibers arranged in such a manner that transmission of light through the fiber array is with a minimum of deviation of transmission therethrough. The light sources include at least one row of individual light producing elements and the graded index optical fiber array includes at least three rows of optical fibers. Each row of light emitting sources is positioned with respect to the graded index array in such a manner that each row of sources is aligned with and parallel to a line of symmetry of the graded index array, where a line of symmetry of said graded index array is defined as a line along said graded index array which will transmit a line of light incident thereon with a minimum deviation in the intensity of light transmitted therethrough.

An optical printing head is provided wherein a row, or rows, of light producing elements are located in alignment with a line of symmetry of a SELFOC lens array having at least three optical fiber rows therein. This provides substantially uniform transmission of light from the lines of light source elements such that the lines of light imaged upon the photosensitive surface have substantially uniform intensity along their lengths. These individual lines are electronically combined, as is well known in the art (See, for example, U.S. Pat. Nos. 3,827,062 and 4,096,486) to form a single image line on the moving photosensitive medium. This electronic technique is not a part of the present invention.

These and other objects, features, and advantages will be apparent from the following more particular description of the preferred embodiments.

BEST MODE FOR CARRYING OUT THE INVENTION

In optical printheads of the type described, linear arrays of light emitting sources are used. Even if the sources are uniformly bright, it has been the situation that the transmission of the imaging system (lens array) might vary too much from place to place so that the required uniformity of illumination of the photosensitive surface would not be obtained. During the course of experimentation, it was discovered that these graded index lens arrays exhibit lines of transmission symmetry wherein the light from a linear array of sources aligned with lines of transmission symmetry is imaged onto a photosensitive surface with a minimum of deviation of transmission along the length of the image lines. These graded index lens arrays were comprised of at least three rows of hexagonally close-packed optical fibers. Thus, it became possible to provide an improved optical printhead which could be used with linear light source arrays without requiring two or more SELFOC lens arrays, even though several semiconductor chips might be used to provide the linear array of light sources.

In all of the description to follow, it will be understood that electronic bit shifting is used to provide a single line of image points at a photosensitive surface, in accordance with the teaching in this art. Such techniques are used, for instance, when the light sources are located in more than one row.

Figure 1:
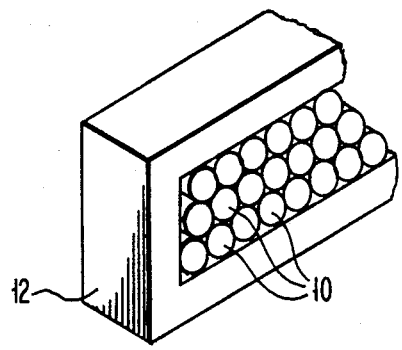
FIG. 1 shows a SELFOC lens array comprising three rows of graded index optical fibers.

FIG. 1 shows a graded index lens array of a type commercially available from the Nippon Sheet Glass Company, as described previously. This lens array is comprised of three rows of optical fiber lenses 10 arranged in a hexagonal close-packed configuration. Each fiber is approximately one millimeter in diameter. A support 12 surrounds the fibers 10.

Figure 2:
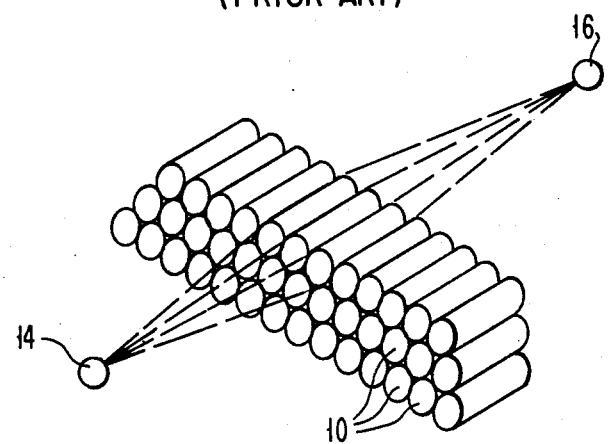
FIG. 2 shows the imaging of a point source by the SELFOC array of FIG. 1 and illustrates the light collecting ability and collimation of this lens array.

FIG. 2 illustrates the transmission of light from a source 14 using the graded index array of lenses 10. More than one discrete lens 10 provides transmission of light from source 14 to make up the image 16. Each lens 10 has a given field of view (acceptance angle) which overlaps with nearby elements 10. For various positions of the source 14 in the object plane, the image intensity will vary. In the practice of this invention, a novel characteristic of the graded index lens array has been discovered, allowing optimum placement of the sources with respect to the lens array in order to provide substantially uniform transmission of light from the object plane to the image plane.

Figure 3:
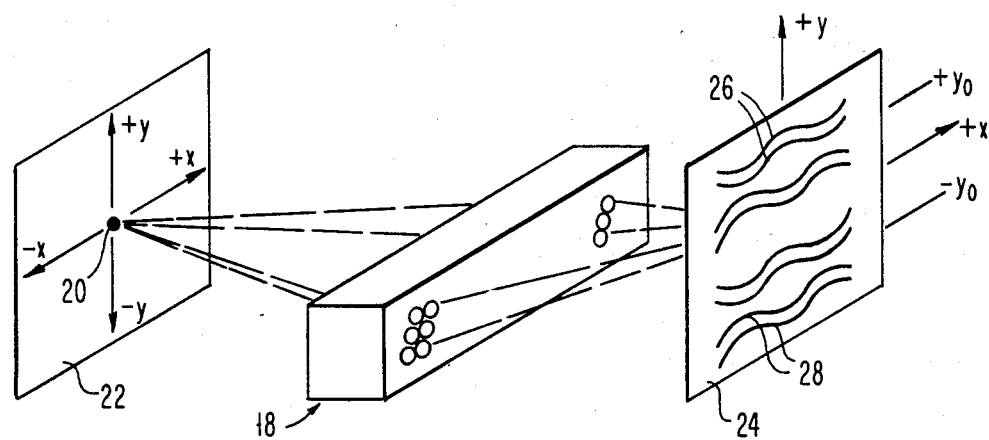
FIG. 3 is a schematic illustration of the experiment which led to the discovery of lines of symmetry as herein defined in a SELFOC lens having a minimum of three optical fiber rows.

FIG. 3 schematically illustrates an experimental arrangement for studying the properties of a graded index lens array 18 used to image light from a source 20 in an object plane 22 onto an image plane 24. In this arrangement, source 20 is moved in the x direction for different values of vertical displacement y, and the intensity of light transmitted through lens array 18 is noted. The variation in local intensity received at the image plane 24 is denoted by the two families 26, 28 of curves drawn in the image plane 24. One family of these experimentally derived curves is shown in more detail in FIG. 4.

The experimental arrangement of FIG. 3 has been used to determine that, for selected assignments of the source 20 with respect to the lens array 18, transmission of light from the source 20 to the image plane 24 can be achieved with a minimum deviation of transmission. For this lens array 18, comprised of three rows of optical fibers, two lines of transmission symmetry exist through which the transmission of light is achieved with a minimum change in intensity at the image plane 24. These lines of symmetry occur at $y = +y_o$ and $y = y_o$.

Figure 4:
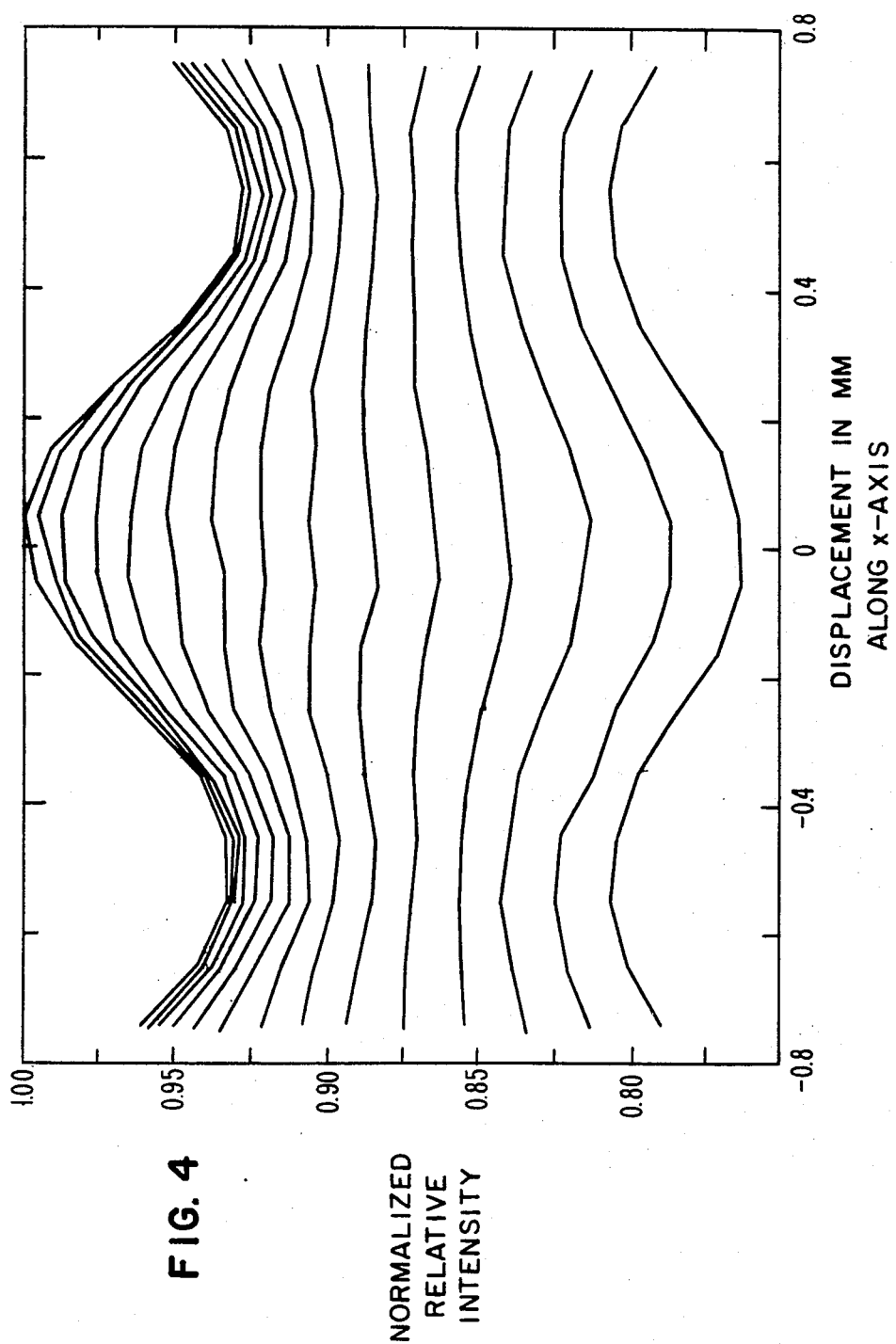
FIG. 4 is a plot of the intensity of light transmitted through the SELFOC array of FIG. 3 onto the image plane, measured along the X axis, for various values of displacement in the y direction.

FIG. 4 is a plot of the relative intensity of light received at the image plane, measured by moving a source along the x axis for different values of y. This family 26 of curves represents the transmission of lens array 18 (FIG. 3) for values of y about the value $y = +y_o$. FIG. 4 shows that there is a value of $y = +y_o$ where the x-direction variation in relative intensity at the image plane is a minimum. This value of $y = +y_o$ corresponds to a line of high symmetry, such that the averaged throughput of light is nearly independent of position along a direction parallel to the x axis. Thus, a line of light sources aligned with and parallel to the line of transmission symmetry at $+y_o$ will be imaged onto the image plane 24 with a minimum deviation of intensity along the image line.

The number of such lines of high transmission symmetry for a graded index lens array 18 is (N−1), where N is the number of rows of lenses in the array 18 (N=3, 4, . . . ). For a three row lens array 18 there are two such high symmetry lines, equally spaced at values $y = \pm y_o$. In a lens array 18 with N=4, there will be three lines of high symmetry, located at $y = -2y_o$, 0, $+2y_o$ (see FIG. 11). In this reference system, $y = 0$ is the geometric center of the lens array.

Figure 5:
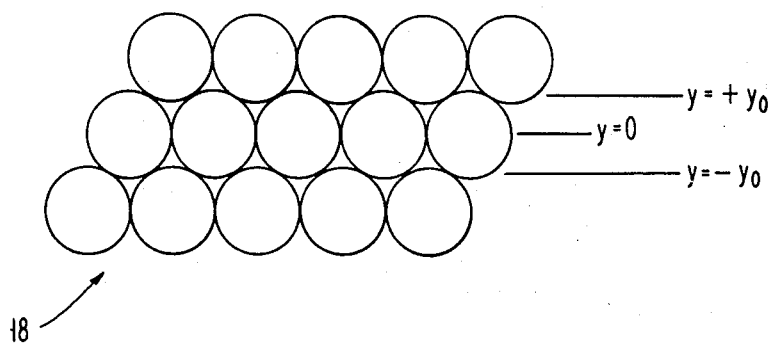
FIG. 5 is a front or back view of part of the SELFOC lens of FIG. 1, illustrating the locations of two lines of (transmission) symmetry for this lens array.

FIG. 5 is a front or back view of the graded index lens array 18 of FIG. 3. The lines of high transmission symmetry at $y = +y_o$ are illustrated. As will be more fully apparent later, a line of transmission symmetry is located between each pair of adjacent fiber rows. For example, in the three row lens array of FIG. 5, the two lines of transmission symmetry are located between the top and middle rows ($y = +y_o$) and between the middle and bottom rows ($y = -y_o$).

Figure 6:
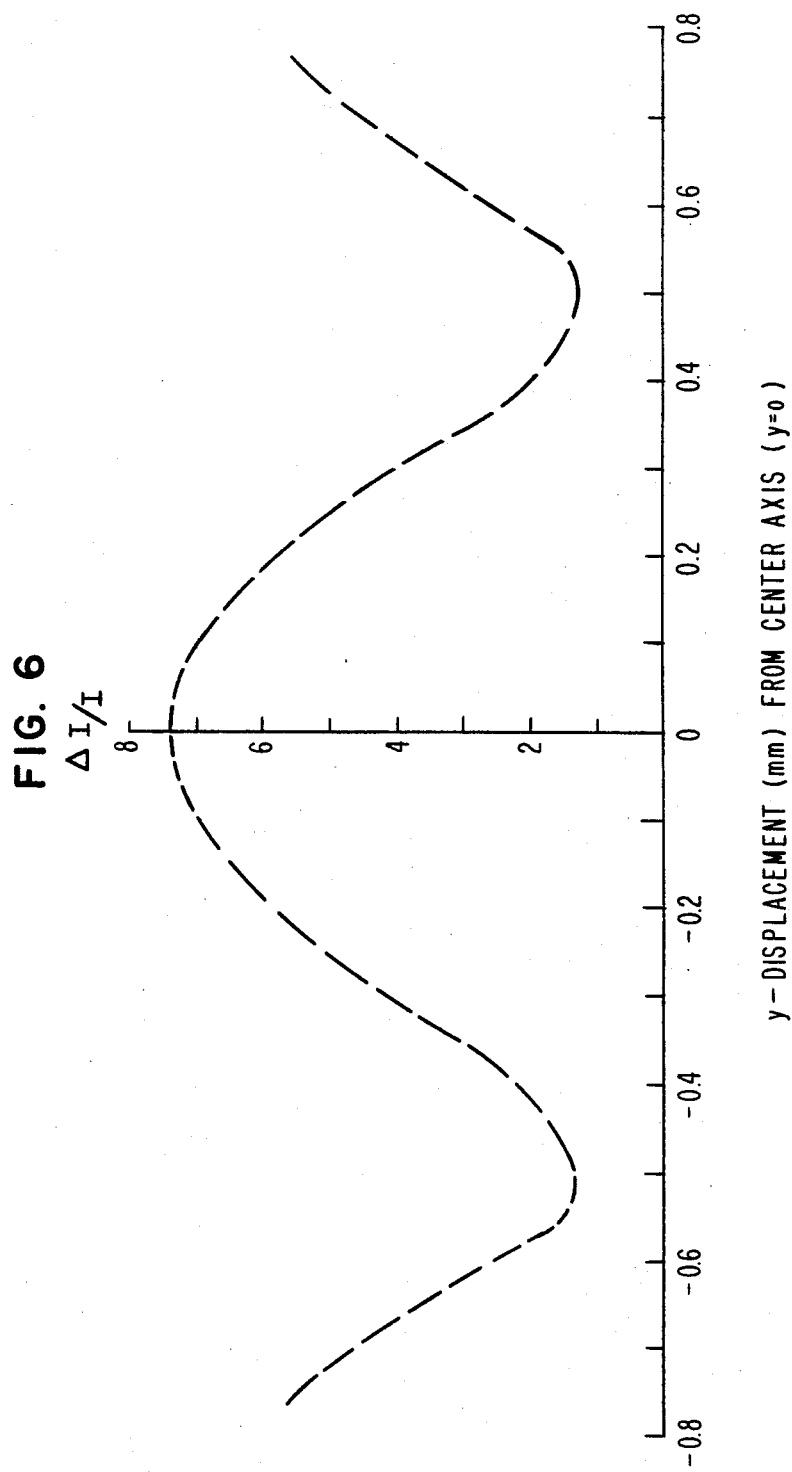
FIG. 6 is a plot of light intensity fluctuation (shown as %-age deviation) in the image plane using the lens array of FIG. 1, measured against the y displacement measured from the geometric center of the lens.

FIG. 6 shows the peak-to-peak percentage variation in light transmission for a small source moved in the x direction, as a function of y, for the data illustrated in FIG. 4. Thus, this FIG. shows the plot of the percentage of fluctuation of light intensity at the image plane for a source moved in the x direction. The quantity ΔI/I is a measure of the total fluctuation of transmission through the lens array 18 for a given y value. For this lens array comprising three rows of optical fibers, a minimum fluctuation of transmission is obtained at $y = -\pm y_o$. It is notable that this fluctuation is approximately one fourth as great as that obtained for $y = 0$.

Figure 7:
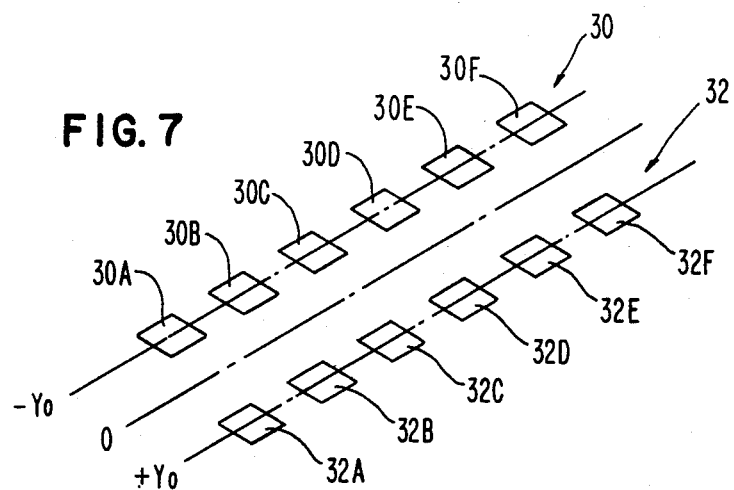
FIG. 7 is a schematic illustration showing the proper placement of two separate rows of light emitting sources with respect to the lines of transmission symmetry of a three row SELFOC lens.
Figure 8:
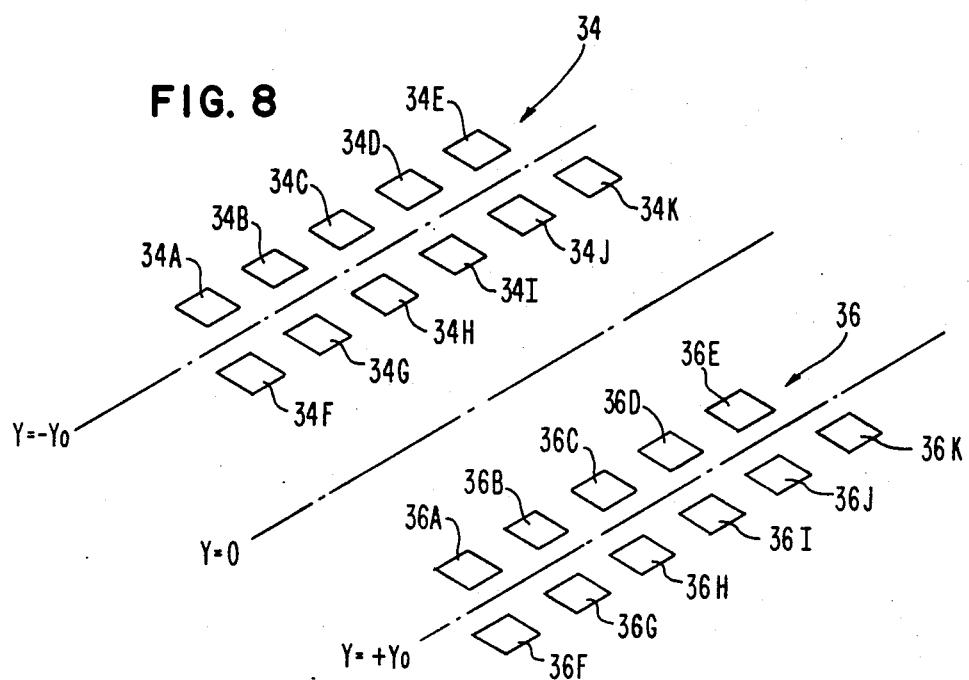
FIG. 8 is a schematic illustration showing the alignment of two linear arrays of light sources, where each linear array includes two rows of light emitting elements, with respect to the lines of transmission symmetry of a three row SELFOC lens.

FIGS. 7 and 8 illustrate the placement of linear source arrays with respect to the lines of high transmission symmetry of a three row graded lens array in order to achieve minimum deviation of intensity of light transmitted through the lens array to a photosensitive surface. In FIG. 7, two linear arrays 30 and 32 of discrete light emitting sources (such as LEDs) are used. Linear array 30 is comprised of a single row of light emitting elements 30A, 30B, . . . 30F, while linear array 32 is comprised of the discrete light emitting elements 32A, 32B, . . . 32F. In order to provide transmission through the three row lens array 18 (FIG. 3), the center positions of sources 30A–30F are aligned with symmetry line $y = -y_o$, while the center positions of sources 32A–32F are aligned with symmetry line $y = +y_o$. The sources are displaced with a shift in x so that when electronically bit shifted, a single line image can be formed.

In FIG. 8, each linear array of light emitting sources is comprised of two closely spaced rows of light emitting elements. Thus, linear source array 34 is comprised of two staggered rows of light emitting elements 34A, 34B, . . . 34K, while linear source array 36 is comprised of two staggered rows of discrete light emitting sources 36A, 36B, . . . 36K. Each source array 34, 36 is disposed symmetrically about a corresponding line of high transmission symmetry of the three row lens array 18 (FIG. 3) in a manner to provide substantially uniform transmission through the lens array. That is, they are aligned with the lines of symmetry located at $y = -y_o$ and $y = +y_o$, respectively. The two rows of light sources in each array are placed as close as possible to one another and are symmetrically located about a line of transmission symmetry to ensure substantially uniform intensity along the image line.

Figure 9:
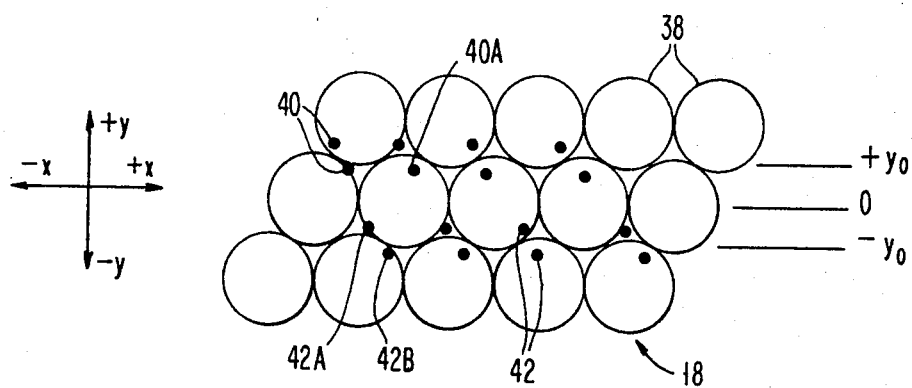
FIG. 9 is a front or back view of a portion of a three row SELFOC lens array showing the placement of the center positions of two arrays of light emitting sources relative to the transmission lines of symmetry of the lens array, where each linear array of source elements includes two rows of light emitting elements.

FIG. 9 shows a portion of a graded index lens array 18 comprised of three rows of fiber lenses 38. The small dots 40 represent the center positions of individual light sources of rows 36 of FIG. 8 in one linear array sources with respect to the symmetry line at $y = +y_o$. The small dots 42 represent center positions of individual light sources of another linear array of sources, rows 36 of FIG. 8, which is aligned with the other line of high transmission symmetry located at $y = y_o$. Here, $y = 0$ is the geometrical center of the lens array and $$|y_o| = \pm y_o \sim \pm \sqrt{\frac{3r}{2}},$$

where r is the radius of an individual fiber 38. In an optical printhead of this type, the diameter of each of the optical fibers 38 would be about one millimeter, while the x direction unit spacing between adjacent light elements such as 42A and 42B would be about 0.1 millimeter. In this example, a representative y-spacing between elements 42A and 42B would be 2 units, while the y-spacing between elements 40A and 42A would be 7 units.

Figure 10:
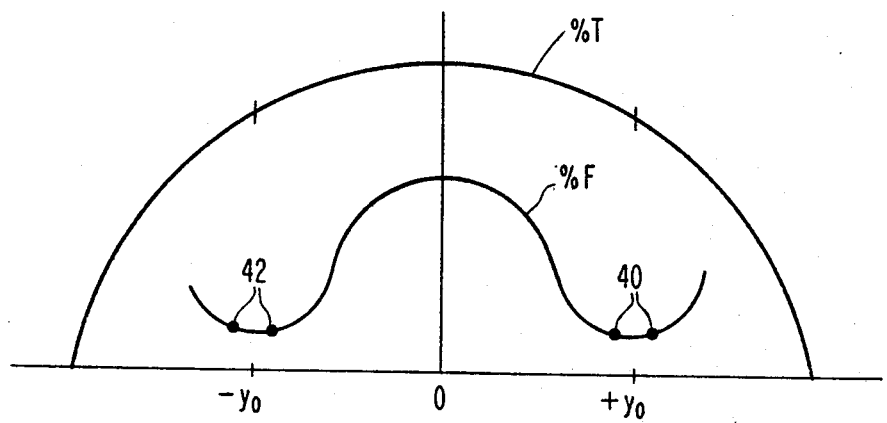
FIG. 10 is a plot of two curves versus the y displacement from the center of the lens array, where the curve %T is the percentage of transmission through the lens array and the curve %F is the percentage of fluctuation in transmission through this lens array.

The placement of linear arrays of light sources with respect to the lens array is designed to minimize the x-dependent fluctuation transmission through the lens array. This does not correspond to placement of the linear array of sources with respect to the lens in order to obtain maximum transmission of light therethrough. This distinction is illustrated in FIG. 10 in which the curve %T represents the (x-averaged) percentage of transmission of light through the lens array 18 (FIG. 3), while the curve %F represents the fluctuation of light through lens 18 (FIG. 3), where both curves are plotted against y displacement from the center of the lens array 18. The curve %F is the curve shown in FIG. 6. The positions of individual light sources 40 and 42 are also shown in FIG. 10.

From FIG. 10, it is apparent that the positions of light sources 40 and 42 are chosen to provide a minimum of x-dependent fluctuation in transmission through lens array 18, rather than maximum x-averaged transmission of light therethrough, (maximum transmission of light through lens array occurs at y=0). The falloff of x-average transmission on both sides of y=o can be compensated by other means, not included herein.

Generally, if the individual light sources are small enough, they can be arranged along a single row which will be aligned as in FIG. 7. However, if the individual light sources cannot be disposed in single rows, for example in a situation where they are too large and would overlap, they can be placed in multiple rows which are aligned with respect to a line of symmetry depicted as in FIG. 8. The placement of light sources in multiple rows should be nearly as symmetrical as possible, with respect to the lines of high transmission symmetry of the lens array. When the individual light sources in a linear array are arranged in multiple rows, a slightly larger fluctuation in intensity will be obtained in each image line on the photosensitive surface, but the same average fluctuation will be achieved along each image line. If an arrangement such as that shown in FIG. 8 were not followed, the design of an optical printhead would be very difficult with respect to the constraints of LED size and shape and the uniformity of illumination dictated by the print window of the photosensitive material, the print window being determined by the uniformity required for good quality printing. For example, requisite uniformity of discharge of the photosensitive layer might be required to be in the range $< +10\%$ from a median value, including possible variations of emission from LED to LED, as well as the above described fluctuations due to the properties of the imaging lens array.

Figure 11:
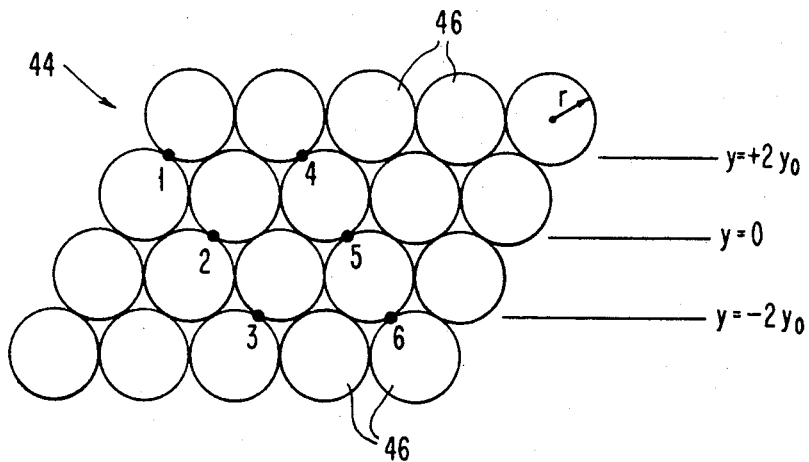
FIG. 11 is a front or back view of a four-row SELFOC lens array illustrating the lines of transmission symmetry thereof.

FIG. 11 shows a graded index lens array 44, comprised of four rows of individual lenses 46. The lines of high transmission symmetry for this 4-row array are located at $y=0$, $y=2y_o$, and $y=+2y_o$, where $y_o=\sqrt{3}r/2$, r, and y=o is the geometrical center of the lens array. The small dots represent the center positions of light sources, located along each line of symmetry, which are electronically activated line by line in the order 1, 2, 3, to produce a single image line.

Figure 12:
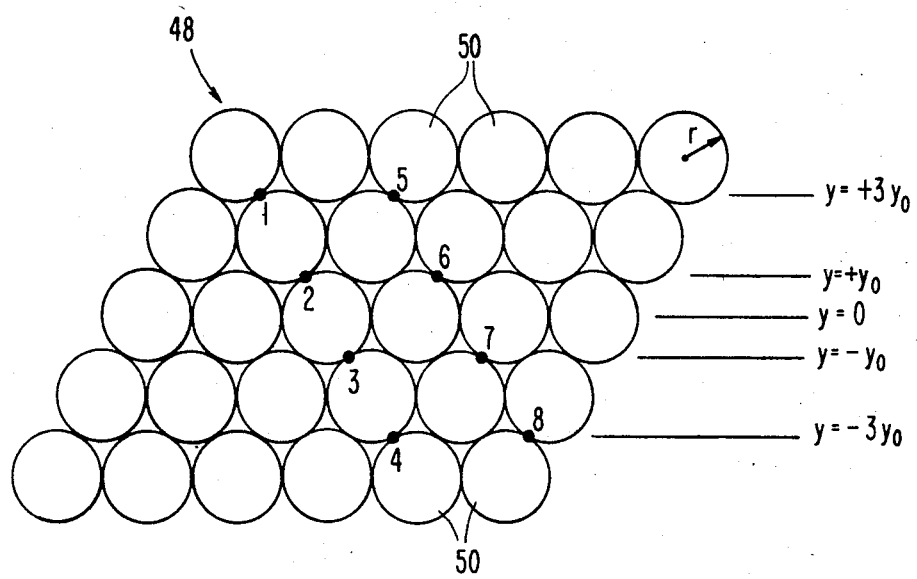
FIG. 12 is a front or back view of a five-row SELFOC lens array illustrating the lines of transmission symmetry thereof.

FIG. 12 shows another graded index lens array 48, comprised of 5 hexagonally close-packed rows of individual fiber lenses 50. For this lens array, there are $(N-1)=4$ lines of high transmission symmetry, located at $y=\pm y_o$ and $y=+3y_o$, where $y_o$ is $3r/2$, r, and y=o is the geometrical center of the lens array. As with FIG. 11, the small dots represent the center positions of light sources which are electronically activated line by line in the order 1, 2, 3, 4.

In the practice of this invention, it has been recognized that a single lens array comprised of hexagonally close-packed rows of individual fiber lenses can be used to correctly image light produced by linear arrays of light emitting elements, even where several semiconductor chips are used to provide the source arrays, and where the individual LEDs occupy a dimension greater than the space between them. To achieve this, the graded index lens array must have a minimum of three rows of fiber lenses.

It is recognized and acknowledged that a two row lens array will have a line of high transmission symmetry at y=0. It is further acknowledged that the art has used a single linear array of light sources aligned with the geometrical center of a 2-row lens array. However, this was done to provide maximum transmission through the lens array, not to minimize intensity fluctuations in the image plane. Heretofore, it was not recognized that a single lens array could be used with multiple linear arrays of light emitting sources, and that such lens arrays would have lines of high transmission symmetry. Thus, the present invention is directed to designs having linear arrays of light emitting sources and graded index lens arrays having a minimum of three rows of closely-packed individual lenses.

Figure 13:
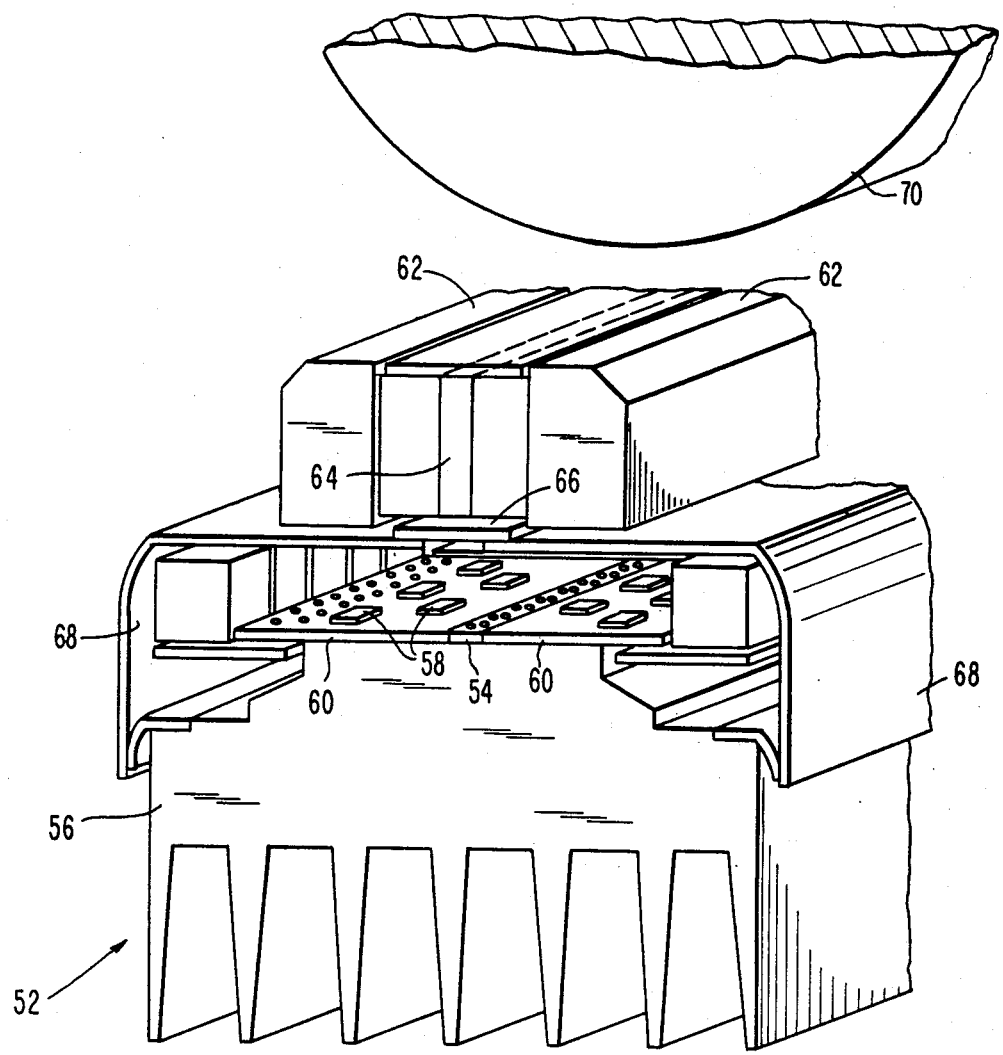
FIG. 13 is an example of an optical print head incorporating the aligned linear light source array and SELFOC lens array of the present invention.

FIG. 13 illustrates a possible embodiment of a practical optical printhead 52 showing the various components thereof. This printhead provides for on-board driver electronics for a plurality of LEDs which are very accurately located with respect to another and with respect to the imaging system. The imaging system is integrated within the total head assembly 52 and can be easily positioned therein. Adequate removal of heat is provided by a heat sink, since substantial heat is generated by the LEDs and the drive circuits within a small area of head 52.

In more detail, optical printhead 52 includes a plurality of rows of LEDs arranged along semiconductor chip 54. Typically, these are gallium arsenide/gallium arsenide phosphide diodes, each of which is provided with a separate anode contact. The cathodes of the diodes are common to one another, and cathode contact is made through the back of the semi-conductor bar 54. A number of these semi-conductor bars are assembled on a common substrate, being the heat sink 56. The LED arrays are assembled cathode side down, to form extended arrays in a straight line. Bonding of the cathodes is accomplished by means of eutectic bonding, or by means of a conductive metal epoxy. To position the LEDs accurately with respect to one another, proper jigging or other locating procedures are used, well known in the art. Within each semiconductor bar 54, standard photolithographic techniques are used to define individual LEDs.

A number of integrated silicon chips 58, each containing a number of drivers and requisite control electronics, such as shift registers, are placed on a common substrate 60 and insulated from one another. Each substrate 60 has a linear array of outputs in one-to-one correspondence to the necessary LED anode connections. Each substrate 60 also has a small number of inputs for supply voltages, control logic signals, and data.

Substrates 60 are also arranged on the common heat sink 56 in a manner flanking the rows of LEDs. Substrates 60 are bonded in place using a large area solder bond, or a thermally conductive epoxy bond.

Bonds are made between each LED contact area and each corresponding drive line. This is accomplished with either high speed serial wire bonding or multiple gang bonding, in a manner also well known in the prior art.

The parts 62 holding the graded index lens array 64 are machined with a slot to fit onto a keyway at each end. Parts 62 also contain a small adjustment screw (not shown) to set the distance between the LEDs and the lens array for precise focusing.

In order to insure integrity of the bonds (silicon to insulating substrate, substrate to heat sink, and LEDs to heat sink, under temperature cycling, the material chosen should be a compromise between heat removal and expansion coefficient match (to the LEDs and insulating substrate). The material must also provide a sufficiently rigid structure to assure flatness and dimensional stability within tolerance requirements. It should also have an overall width sufficient to obtain a broad area contact to the finned heat sink 56, for transfer of heat to the environment by forced or natural convention.

The glass window 66 is hermetically sealed to cover 68, which in turn is hermetically sealed to the heat sink 56 to form a hermetic package for the LEDs, the silicon driver chips 58, and the ceramic interconnection 60. Cover 68 carrys the lens array holding parts 62 and the lens array 64 such that the lens array is positioned opposite window 66.

A portion 70 of a drum containing a photosensitive material on its surface is also shown. Light from the LED arrays is imaged onto the drum 70 to accomplish printing. In the practice of this invention, it is shown how to use a single graded index lens array to substantially uniformly image a plurality of linear light source arrays onto a photosensitive surface. The invention comprises linear light source arrays having any number of rows of discrete light producing elements, or a continuous light source, together with a graded index lens array having at least three rows of fiber lenses.

While specific embodiments have been shown for the practice of this invention, it is within the skill of the art to devise other embodiments without departing from the spirit and scope of this invention.

Having just described my invention, what I claim as new, and desire to secure by Letters Patent is:

1. An optical printhead, comprising:
   a linear array of light sources for providing light outputs to an imaging system,
   an imaging system, including a hexagonal close-packed lens array having at least three rows of lenses therein, said lens array having at least two lines of greatest transmission symmetry where said lines of greatest symmetry are lines of minimum deviation of transmission of optical radiation therethrough, and
   wherein said linear array of light sources is substantially parallel to and aligned with respect to one of said lines of greatest symmetry such that transmission of said radiation through said lens array is with minimum deviation of transmission.

2. The optical printhead of claim 1, further including a photosensitive surface, where said linear array is a row of discrete light sources, the light outputs of said sources striking said lens array and being transmitted to said photosensitive surface.

3. The optical printhead of claim 1, where said light sources are light emitting diodes.

4. The optical printhead of claim 1, where said linear array is comprised of a plurality of rows of said light sources, said rows being symmetrically aligned with respect to said one line of greatest transmission symmetry of said imaging system.

5. The optical printhead of claim 1, including a second linear array of light sources substantially parallel to and aligned with the other one of said lines of greatest symmetry of said lens array.

6. The optical printhead of claim 5, wherein each linear array is comprised of a plurality of light emitting diodes, each linear array of light emitting diodes being positioned with respect to said imaging system such that the transmission of light from each linear array through said imaging system occurs with a minimum deviation of transmission through said imaging system.

7. An optical printing/copying system, including therein:
   a plurality of linear arrays of light emitting diode light sources, each linear array being comprised of a plurality of rows of said light emitting diodes,
   a photosensitive surface onto which linear light images from said linear arrays are imaged by an imaging system,
   said system including a lens array having a plurality of graded index optical fiberlenses therein arranged in hexagonal close-packing, said lens array having at least three rows of said optical fibers therein, said lens array having at least two lines of greatest transmission symmetry wherein said lines of greatest transmission symmetry are lines along which incident radiation from said linear arrays of light emitting diodes is transmitted to said photosensitive surface with a minimum deviation of transmission along the length of the image lines produced on the surface of said photosensitive medium, and
   wherein each of said linear arrays of light emitting diodes is substantially parallel to and aligned with respect to a line of greatest transmission symmetry of said lens array such that transmission of said optical radiation from said linear arrays through said graded index optical fiber array is with minimum deviation of transmission.

8. The printing/copying system of claim 7, wherein said lens array is comprised of three rows of optical fiber lenses.

9. The printing/copying system of claim 7, where the optical axes of the optical fibers in said lens array are directed perpendicularly to said photosensitive surface and are arranged opposite to each linear array of light emitting devices.

10. The printing/copying system of claim 9, where said light emitting devices are formed on a plurality of semi-conductor chips.

* * * * *